United States Patent [19]

Meyer et al.

[11] 3,981,847

[45] Sept. 21, 1976

[54] PROCESS FOR THE PRODUCTION OF POLYAMIDOCARBOXYLIC ACIDS

[75] Inventors: Gerhard Meyer; Anton Toth, both of Obernburg; Dieter Laudien, Wuppertal, all of Germany

[73] Assignee: Akzona Incorporated, Asheville, N.C.

[22] Filed: Nov. 7, 1974

[21] Appl. No.: 521,848

[30] Foreign Application Priority Data

Nov. 16, 1973 Germany............................ 2357297

[52] U.S. Cl. ....................... 260/78 TF; 260/46.5 E; 260/47 CP; 260/47 P; 260/49; 260/65
[51] Int. Cl.²........................................... C08G 73/10
[58] Field of Search.............. 260/47 CP, 65, 78 TF, 260/49, 47 P, 46.5 E, 30.2, 32.4, 32.6 N, 32.8 N, 33.6 R

[56] References Cited
UNITED STATES PATENTS

| 3,190,856 | 6/1965 | Lavin et al............................ 260/65 |
| 3,542,735 | 11/1970 | Lynch................................... 260/47 |
| 3,861,956 | 1/1975 | Schwarcz........................... 117/68.5 |

*Primary Examiner*—Lester L. Lee
*Attorney, Agent, or Firm*—Johnston, Keil, Thompson & Shurtleff

[57] ABSTRACT

A process for the producing a polyamidocarboxylic acid, or so-called polyamic acid, which is the prepolymer in forming a polyamide and which requires the reaction of a tetracarboxylic acid dianhydride with a diprimary diamine below about 50°C. in an anhydrous, polar, aprotic organic solvent, characterized by an initial treatment of the dianhydride by only wetting with an inert organic solvent or by at least wetting this dianhydride with the polar, aprotic solvent and thereafter adding to the wetted dianhydride a solution of the diamine in the polar, aprotic solvent under thorough mixing, preferably within a very short period of time after treating the dianhydride. Stable polyamic acid solutions formed in this manner are useful intermediates in preparing films, filaments or other shaped polyimide products.

9 Claims, No Drawings

PROCESS FOR THE PRODUCTION OF POLYAMIDOCARBOXYLIC ACIDS

The present invention is concerned with a method for the preparation of polyamidocarboxylic acids which are commonly referred to as "polyamic acids". These polyamic acids are the prepolymers required for the production of polyimides. See, for example, Sroog et al., Poly. Prepr., Amer. Chem. Soc., Div. Polym. Chem., 5, 132 (1964). Polyimides as the final products are valuable resins which are especially distinguished by their high thermal stability. They result from a cyclization reaction of the polyamidocarboxylic acids or so-called polyamic acids under the influence of heat or dehydrating agents. Polyimides with high thermal stabilty cannot be formed or shaped in the melt nor from solutions because of their physical and chemical characteristics. Therefore, in order to produce shaped polyimide bodies, the prepolymers are formed in the desired manner and subsequently subjected to cyclization while retaining their original form. The quality and properties of the resulting polyimides depend to a large extent upon the quality of the initial polyamidocarboxylic acid solution, especially its viscosity and homogeneity.

Polyamidocarboxylic acids, i.e. the polyamic acids, are accessible through the polyaddition of diamines with tetracarboxylic acid dianhydrides. It is known to carry out this reaction in a polar solvent which is capable of dissolving the reaction product as well as at least one of the reaction components. German Patent application (DAS) No. 1,420,706 describes the following procedures:

1. Pre-mixing the dry solid reactants (diamine and tetracarboxylic acid dianhydride) and then gradually introducing this solid mixture in portions into a polar organic solvent using vigorous stirring;
2. Dissolving the diamine in the polar solvent and adding the dianhydride in solid form; or
3. Alternately dosing the solid diamine and the solid dianhydride into the solvent.

It is also known in the synthesis of polyamic acids to use solvent mixtures non-solvents, e.g. nonpolar solvents such as benzene, toluene, xylene or cyclohexane (DAS 1,202,981). These known methods, however, do not permit the preparation of polyamic acids of reproducible molecular weights. Furthermore, the polymer solutions obtained by this method are not homogeneous. They contain gel particles which are eliminated only by extensive stirring, whereby a considerable degradation of the polymer must be tolerated.

The disadvantages described above can be partly avoided by the method described in DAS 2,004,495. According to this method, the reaction components are dispersed in an inert, nonpolar organic solvent which is then added to a polar, aprotic, anhydrous solvent while stirring vigorously. Although this method makes it possible to obtain homogeneous polymer solutions of reproducible molecular weights, it does possess an aggravating disadvantage. Thus, the polymer solutions obtained in this manner have a tendency toward phase separation if heated to temperatures above 50°C., something which leads to the formation of hollow voids or pores in the molded bodies. This results in porous films and filaments of inadequate mechanical strength.

For the above-mentioned reasons, the known processes for preparing polyamic acid solutions are not suitable for obtaining polyamide products with good physical and mechanical properties.

It is one object of the present invention to avoid the above-noted problems which generally always arise in attempting to prepare polyamidocarboxylic or so-called polyamic acids in the form of their solutions suitable for conversion into polyamide products, especially thermally stable films, filaments or the like. Various other objects and advantages of the invention will become more apparent upon consideration of the following detailed disclosure.

In accordance with the invention, the polyamidocarboxylic or so-called polyamic acid is prepared by reacting a tetracarboxylic acid dianhydride with a diprimary diamine at a temperature below about 50°C., especially within a range of about −15°C. to 40°C. and under substantially water-free conditions in an anhydrous, polar, aprotic organic solvent. The improvement of the invention is particularly characterized by an initial treatment of the dianhydride reactant through addition thereto of a limited amount of at least one solvent, using (a) an inert organic solvent in an amount sufficient only to wet the dianhydride or (b) a polar, aprotic organic solvent in an amount at least sufficient to wet the dianhydride, and then adding to the treated dianhydride under thorough mixing a solution of the diamine reactant in the polar, aprotic organic solvent. This addition of the diamine solution may be done continuously or in portions and is preferably carried out rapidly enough to avoid forming any substantial amount of a charge transfer complex.

The polyamidocarboxylic acids or so-called polyamic acids are generally known and can be represented by the recurring polymer unit of the formula:

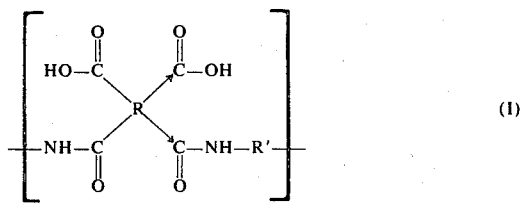

(I)

in which

R is a tetravalent mono- or polycyclic organic radical, e.g. an aromatic-aliphatic radical or an aliphatic radical containing at least two carbon atoms, although R generally has a hydrocarbon structure, its carbon chain or skeleton may be interrupted by the ether linkage —O— or by —CO—O—, —CO—NH— or —SO$_2$— bridges, any single carbon atom of the tetravalent radical being connected to not more than two carbonyl groups;

R' is a divalent aromatic, aliphatic or cycloaliphatic radical containing at least two carbon atoms in an essentially hydrocarbon structure which may be interrupted by —O—, —N—, —S—, —SO$_2$—, —Si— or —P— bridges, with R' being attached to the nitrogen atoms via different carbon atoms; and the bonds shown as the arrows represent equivalent isomers.

The polyaddition is thus carried out by the reaction of at least one diprimary diamine of the formula $$H_2N - R' - NH_2 \qquad II.$$

with an approximately equimolar amount of at least one tetracarboxylic acid anhydride of the formula

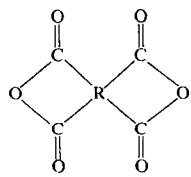

(III)

wherein R and R' have the same meanings given above.

In the process of the invention, various tetracarboxylic acid anhydrides of the Formula (III) can be used. The tetravalent radical R may be an aromatic, aliphatic, cycloaliphatic or a heterocyclic radical or a combination of aromatic and aliphatic radicals. Each of the four carbonyl groups of the dianhydride is attached to a different carbon atom, but each pair of carbonyl groups forming the anhydride ring is preferably attached to adjacent carbon atoms.

The two most common tetracarboxylic acid dianhydrides used in producing polyimides have been pyromellitic acid dianhydride (PMA) and 3,4,3',4'-benzophenone-tetracarboxylic acid dianhydride (BTA). However, a wide variety of these dianhydrides or their equivalent tetracarboxylic acids have been suggested in the prior art under the Formula (III) above. For example, attention is directed to the different aromatic tetracarboxylic acids disclosed in U.S. Pat. No. 2,731,447 in which 2,2-bis-(3,4-dicarboxyphenyl)-propane or its dianhydride is preferred.

For purposes of the present invention, the most useful dianhydrides or their equivalent acids are those of the Formulae (III) in which R is a tetravalent organic radical formed by mono- or bicyclic compounds with an essentially hydrocarbon structure including benzene, naphthalene, diphenyl, diphenyl ether, or diphenyl sulfone as well as bis-phenylalkanes in which the alkane is preferably of 1 to 6 and especially 1 to 4 carbon atoms. The cyclic rings may also contain essentially inert substituents such as lower alkyl, lower alkoxy or halogen, especially methyl, methoxy, chlorine or bromine. On the other hand, one may also use tetravalent saturated aliphatic groups of 2 up to preferably not more than about 12 carbon atoms in an essentially hydrocarbon structure, including cycloaliphatic groups of one or two rings.

Examples of suitable tetracarboxylic acid dianhydrides are listed as follows:

pyromellitic acid anhydride;
2,3,6,7-naphthalene-tetracarboxylic acid dianhydride;
1,2,4,5- ″
1,2,5,6- ″
1,4,5,8- ″
1,8,9,10-phenanthrene-tetracarboxylic acid dianhydride;
2,6-dichloronaphthalene- ″
2,2',3,3'-diphenyl- ″
3,3',4,4'-diphenyl- ″
perylene-3,4,9,10- ″
bis-(3,4-dicarboxyphenyl)-sulfone dianhydride;
bis-(3,4-dicarboxyphenyl)-ether dianhydride;
3,3',4,4'-benzophenone-tetracarboxylic acid dianhydride;
2,2',3,3'-benzophenone ″
benzene-1,2,3,4- ″
pyrazine-2,3,5,6- ″
thiophene-2,3,4,5- ″
pyrrolidine-2,3,4,5- ″
1,4,5,8-decahydronaphthalene- ″
4,8-dimethyl-1,2,3,5,6,7-hexahydronaphthalene-1,2,5,6-tetracarboxylic acid dianhydride;
2,6-dichloronaphthalene-1,4,5,8-tetracarboxylic acid dianhydride, 2,7-dichloronaphthalene-1,4,5,8- ″
2,3,6,7-tetrachloronaphthalene-1,4,5,8- ″
cyclopentane-1,2,3,4-tetracarboxylic acid dianhydride;
cyclohexane-1,2,4,5- ″
2,2 bis-(3,4-dicarboxyphenyl)-propane dianhydride;
2,2 bis-(2,3-dicarboxyphenyl)- ″
1,1-bis-(3,4-dicarboxyphenyl)-ethane dianhydride;
1,1-bis(2,3-dicarboxyphenyl)- ″
bis-(2,3-dicarboxyphenyl)-ethane dianhydride;
bis-(3,4-dicarboxyphenyl)-methane dianhydride; and
ethylene-tetracarboxylic acid dianhydride.

Compounds in which the hydrocarbon structure of the radical R is interrupted by carboxyl or amido groups are also suitable as tetracarboxylic acid dianhydrides. Examples of such compounds have the formulae:

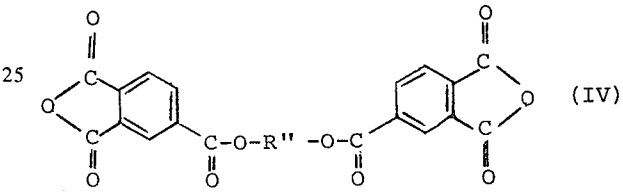

(IV)

or

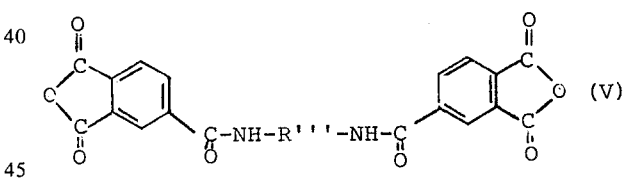

(V)

wherein R'' and R''' each designate a saturated aliphatic radical, preferably alkylene containing 2–18 carbon atoms, an aromatic radical or a combined aromatic-aliphatic radical as prescribed for R above. Such tetracarboxylic acid dianhydrides are prepared by reaction of diamines, e.g. ethylenediamine, hexamethylendiamine, 4,4'-diaminodiphenylether, 4,4'-diaminodiphenylmethane or 4,4'-diaminodiphenylsulfone with the 4-acid chloride of trimellitic acid anhydride or by reaction of trimellitic acid with a lower alkyl ester of a diol or diphenol for example: ethylene glycol, 1,3-propylene glycol, 1,2-propylene glycol, 1,2-butane diol, 1,4-butane diol, 1,2-pentane diol, 1,2-hexane diol, 1,6-hexane diol, 1,2-heptane diol, 1,8-octane diol, 1,10-decane diol, diethylene glycol, triethylene glycol, 2,2-dimethyl-1,3-propane diol, 2,2,4-trimethylhexane diol, 1,3-cyclohexanediol glycerin, 2-acetyl glycerin, p-xylene diol, 1,4-cyclohexane diol, 1,4-cyclohexane dimethanol, 4,4-dihydroxy-diphenyl ether, bis-(4-hydroxyphenyl)-methane, 2,2-bis-(4-hydroxyphenyl)-propane, 4,4'-(diethanol)-diphenyl ether, 2,2'-[methylene-bis-(p-phenoxy)]-diethanol, and 2,2'-[isopropylene-bis-(p-phenoxy)]-diethanol and the halogen substituted derivatives thereof.

A large number of diamines may be used in the process of the invention as represented by the Formula (II) above, preferably those in which R' represents a divalent saturated hydrocarbon radical but also those in which the hydrocarbon structure can be interrupted by —O—, —N—, —S—, —SO$_2$—, —Si— or —P— bridges. The phosphorus bridge is preferably a phosphine bridge such as the phosphine oxide radical —PO—, and the nitrogen bridge is preferably the imino bridge —NH— in which the hydrogen may be replaced by lower alkyl, cyclohexyl or phenyl. An alkylene or dialkylene polyamino bridge is also suitable, e.g. divalent radicals such as —NH—(lower alkylene)—NH— or —NH—(lower alkylene)—NH—(lower alkylene)—NH— wherein lower alkylene is up to 6 carbon atoms, preferably 2 to 4 carbon atoms. Again, the hydrogen atom of the imino linkage may be replaced by lower alkyl, phenyl or cyclohexyl.

Examples of suitable diamines are as follows:
4,4'-diamino-diphenyl-ether;
4,4'-diamino-diphenyl-methane;
4,4'-diamino-diphenyl-propane;
m-phenylene-diamine;
p-phenylene-diamine;
4,4'-diamino-diphenyl-sulfone;
benzidine;
4,4'-diamino-diphenyl-sulfide;
3,3'-diamino-diphenyl-sulfone;
bis-(4-amino-phenyl)-phosphine-oxide;
bis-(4-amino-phenyl)-diethyl-silane;
m-xylyene-diamine;
p-xylylene-diamine;
hexamethylene-diamine;
heptamethylene-diamine;
octamethylene-diamine;
nonamethylene-diamine;
decamethylene-diamine;
dodecamethylene-diamine;
2,11-diamino-dodecane;
4,4-dimethylheptamethylene-diamine;
3-methylheptamethylene-diamine;
2,2-dimethyl-propylene-diamine;
2,5-dimethylhexamethylene-diamine;
2,5-dimethylheptamethylene-diamine;
5-methylnonamethylene-diamine;
1,12-diamino-octadecane;
1,4-diamino-cyclohexane;
2,6-diaminopyridine;
1,5-diaminoaphthalene;
3,3'-dimethyl-4,4'-diamino-biphenyl;
2,4-bis-(β-amino-t-butyl)-toluene;
bis-(p-β-amino-t-butyl-phenyl)-ether;
p-bis-(2-methyl-4-amino-pentyl)-benzene;
p-bis-(1,1-dimethyl-5-amino-pentyl)-benzene;
bis-(p-amino-cyclohexyl)-methane;
1,2-bis-(3-amino-propoxy)-ethane:
3-methoxy-hexamethylene-diamine;
bis-(4-amino-phenyl)-N-methylamine;
3,3'-dimethoxy-benzidine;
$H_2N(CH_2)_3OCH_2CH_2O(CH_2)_3NH_2$;
$H_2N(CH_2)_3S(CH_2)_3NH_2$;
$H_2N(CH_2)_3N(CH_3)(CH_2)_3NH_2$;
piperazine.
2,2,4-trimethylhexamethylene-diamine and
2,4,4-trimethylhexamethylene-diamine It is also possible to use a mixture of the tetracarboxylic acid dianhydrides or a mixture of the diamines or even mixtures of several of the listed initial materials. In such cases, the product is a mixed polyamidocarboxylic acid. In all cases, it is especially desirable to prepare those polyamidocarboxylic or so-called polyamic acids which upon heating will yield very thermally stable polyimides, i.e. polymers which remain stable up to temperatures of about 500°C. Linear non-crosslinked polyamic acids are especially desirable for providing thermally stable films and filaments. For a general discussion of these polymers, i.e. both the polyamic acids and the polyimides as well as the initial monomeric reactants, attention is directed to Chapter 9 of "Polymer Syntheses", Volume I, by Sandler and Karo, Academic Press, New York (1974), and the references cited therein.

The polar, aprotic organic solvent used in the process of the invention is conventional in preparing polyamic acids and polyimides, usually an N-dialkylated amide of a short chain carboxylic acids, e.g. the N-lower alkylamides of lower fatty acids such as dimethylformamide, diethylformamide and dimethylacetamide. One may also select such polar, aprotic solvents as dimethylsulfoxide, dimethylsulfone, tetramethylene sulfone, dimethyltetramethylene sulfone, N-methylpyrrolidone, pyridine and hexamethylphosphoric acid triamide. Mixtures of these solvents are also useful.

It is especially preferred to use dimethylformamide, dimethylacetamide, N-methylpyrrolidone or dimethylsulfoxide. All of the above mentioned polar, aprotic organic solvents are suitable either as wetting agents or suspending agents. Furthermore, limited amounts of organic solvents which are practically inert under the reaction conditions e.g. ether, benzene, toluene, xylene, tetrahydrofuran, decalin, tetralin, dioxane, acetone, methylethylketone butyrolactone and benzine, can be applied according to the invention, essentially as wetting agents. Both the polar, aprotic solvent and the inert organic solvent should be substantially free of water.

The polar aprotic solvent is ordinarily used in an amount of at least 60% by wt. up to about 99% by wt. and preferably 70–90% by wt. with reference to the polyamidocarboxylic acid, i.e. such that the concentration of the polymer in the solution is not more than about 40% by weight as a maximum, preferably between 1 and 30% by wt. The required amount depends upon the solubility of the diamine as well as upon the desired viscosity of the polyamic acid solution being prepared. It is preferable to use just that amount of polar aprotic solvent which is sufficient to dissolve the diamine. Under these conditions, polyamic acid solutions are obtained which are easily shaped or formed into useful products.

When using an inert organic solvent, the dianhydride reactant is only wetted with the solvent, i.e. only that amount of solvent is used which is required to practically completely cover the surface of the dianhydride with the solvent. It is not necessary to use any more than this "wetting" or "surface covering" amount of the inert organic solvent so that one should avoid large excess amounts not required for a complete wetting or surface coating. In all cases, the amount of the inert organic solvent should be less than 33% by wt. and ordinarily less than about 25% by wt. of the total amount of the polar, aprotic solvent. It is especially preferred to use 1–20% by wt., most advantageously about 3–12% by weight with reference to the amount of the polar, aprotic organic solvent used in making up the polymer solution. The required minimum amount of inert solvent depends upon the size of the dianhydride particles as well as upon the wetting capability of the particular solvent. This minimum amount within the recited range can be readily determined on a small sample of the solid dianhydride particles to be used as the reactant.

If no inert organic solvent is utilized, then the dianhydride is at least wetted with the polar, aprotic organic solvent. However, larger amounts of the polar aprotic solvent may be added to the dianhydride which then is not only wetted but further made into a paste or suspended. Here, again, the minimum amount required for at least wetting the dianhydride reactant depends upon the size of particles of the reactant as well as upon the wetting capability of the solvent, something which can easily be determined. For the wetting, paste formation or suspension, it is possible to use about 1–20% by wt. and preferably 3–10% by wt. of the total amount of polar, aprotic organic solvent required to make up the polyamic acid solution. Larger amounts up to about 50% by wt. of total solvent are feasible but less desirable in maintaining relatively viscous and formable polymer solutions as final products.

For carrying out the reaction of the invention, the following steps and precautions are preferably observed. It has become apparent that the quality of the dianhydride influences the homogeneity of the resulting polyamic acid solution. It is expedient to use a very pure dianhydride, e.g. dianhydride with a degree of purity of 99.9%. Even the grain size of the dianhydride tends to affect the progress of the polyaddition. Larger dianhydride crystals are easily coated with a polymer film or skin, thus contributing to the formation of a gel. For this reason, it is preferable to use a dianhydride ground to a fine particle size. If there is an incomplete wetting of the dianhydride, the resulting polymer particles agglomerate and it is impossible to obtain a solution free of gel.

The wetting, pasting or suspension should be accomplished at temperatures as low as possible, e.g. at about 5° to 20°C. The duration of the wetting, pasting or suspension periods should be as short as possible and ordinarily should not exceed approximately 5 minutes. When using a substantially longer treatment period in this initial conditioning of the dianhydride, polymer products of lower molecular weights are obtained. In the event a polar aprotic wetting or suspending agent is applied, the longer treatment period can cause the formation of a charge transfer complex which leads to an undesirable reamidization during the course of the reaction. The temperature for the solvent treatment of the dianhydride is maintained at approximately 5° to 10°C. prior to the reaction, i.e. before reacting the diamine with the dianhydride.

The purity of the diamine also can affect the viscosity of the polyamic acid solution being prepared. Therefore, the diamine reactant should also be as pure as possible. The diamine is dissolved in one of the designated polar aprotic solvents and the resulting solution likewise cooled to about 5–10°C. prior to the reaction.

The reaction takes place under cooling with and vigorous stirring or mixing. The pre-cooled diamine solution can be quickly stirred into the pre-cooled wetted solids, paste or suspension of the dianhydride, either continuously or in dosed portions. The reaction speed is extremely high. With a rapid removal of the heat of reaction, the reaction can be completed within about 10 to 120 seconds.

By using equimolecular amounts of the reaction components, i.e. one mol of the diamine to one mol of the dianhydride, polyamic acids of high molecular weight are obtained. This is also true if one of the reaction components is used in a slight excess up to about 3% by wt. However, with a higher excess of diamine or dianhydride, the resulting polyamic acids have undesirably lower molecular weights.

The process of the invention yields completely homogeneous polyamidocarboxylic acid or so-called polyamic acid solutions of reproducible viscosity. The reduced viscosity of the polyamic acid, measured as a 0.5% by wt. solution of the polymer in dimethylformamide (or other aprotic solvent) at 20°C. amounts to a minimum value of $\eta_{red} = 0.2$, but as a rule, it lies in a range of $\eta_{red} = 0.6$ to 3.2. The obtained polyamic acid solutions can be formed into foils, films, filaments or other shapes according to known procedures. Furthermore, they are suitable as varnishes or the like for the production of wire coatings and other laminates or surface structures. The polyamic acid products as prepolymers can subsequently be cyclized into their corresponding polyimides as the final polymer products in the usual manner while retaining their initial form or shape.

By using tetracarboxylic acid dianhydrides containing —CO—O— and —CO—NH— groups, prepolymers are obtained which are converted during the dehydration and cyclizing process into the corresponding polyesterimides or polyamide-imides. Prepolymers prepared in this manner according to the process of the invention will also exhibit a reduced viscosity of between 0.6 and 3.8, measured as noted above. These prepolymers also possess good adhesion characteristics and are therefore especially useful for the production of thermally stable lacquers.

The essential difference between the process of this invention and the known process of DAS 2,004,405 may be explained as follows. It has been pointed out in the literature of this art that the dianhydride should not be brought into contact with the polar, aprotic organic solvent prior to its reaction with the diamine, in order to avoid the formation of charge transfer complexes which cause an undesirable reamidization reaction; see Koslesnikow et al, Vysokomolekulyarnye Soedineniya 10 (1968), Series A, No. 7, pages 1511 to 1517; compare also DAS 2,004,495, column 3, lines 64–68. According to the known method of DAS 2,004,495, the dianhydride as well as the diamine are suspended in a nonpolar organic solvent. Due to the amounts of material involved, relatively large amounts of solvents are required for the suspension. Furthermore, the finished polyamic acid solutions exhibit an unfavorable ratio between the polar solvent and the nonpolar solvent which has an adverse effect on the shaping or forming of the prepolymer, especially when spinning or pouring solutions at higher temperatures. As mentioned above, this kind of solvent mixture tends to result in porous films and filaments of lower strength.

In contrast to the method of DAS 2,004,495, the process of the present invention only wets and/or suspends the dianhydride, and surprisingly this can even be accomplished solely with the polar organic solvent.

This new procedure results in some important advantages. Only one solvent is required when a polar, aprotic organic solvent is used for the initial wetting or suspension of the dianhydride as a preliminary step in the polyaddition. The preparation of the polyamic acid and the recovery of the solvent then presents no problem. Where a nonpolar, inert organic solvent is used for the initial wetting and subsequent suspension of the dianhydride, the advantage over the method of DAS 2,004,495 resides in the fact that considerably smaller amounts of the nonpolar solvent are required. Therefore, the finished polyamic acid solution contains a much more favorable ratio of the two solvents, thus improving the conditions for the shaping of the prepolymer and the recovery of the solvent. Furthermore, the products obtained by the process of the present invention, compared to those from DAS 2,004,495, are distinguished by their better physical properties.

In the working examples given next hereinafter, the following abbreviations are used:

For the dianhydrides:
    PMA = pyromellitic acid dianhydride;
    BTA = benzophenone-tetracarboxylic acid dianhydride.
For the diamines:
    ODA = 4,4'-diamino-diphenylether;
    MDA = 4,4'-diamino-diphenylmethane;
    SDA = 4,4'-diamino-diphenylsulfone.
For the solvents:
    DMF = dimethylformamide;
    NMP = N-methylpyrrolidone;
    DMAC = dimethylacetamide;
    THF = tetrahydrofuran;
    AMK = ethylmethylketone.

EXAMPLE 1

4.36 g (0.02 mol) of finely ground pyromellitic acid dianhydride (PMA) were wetted with 5 g of acetonitrile and cooled to 10°C. Then, 3.96 g (0.02 mol) of 4,4'-diamino-diphenylmethane (MDA) in 35 g DMF, cooled to 10°C., were added under vigorous stirring (1000 – 1300 rpm). After about 10–15 seconds of stirring and cooling, the polyaddition reaction was completed. The resulting polymer solution was viscous, homogeneous, and free of gel particles. The temperature rose after completion of the reaction to about 28°C. The reduced viscosity amounted to 3.1, measured 30 minutes after termination of the reaction in a 0.5% DMF solution at 20°C. Unless otherwise stated, all measurements of the reduced viscosity ($\eta_{red}$) are carried out in these examples in this manner. The polymer solution was diluted with DMF to a 10% by weight solids content and applied to a glass plate with a spreading device to form a 0.1 mm thick film. A clear, even, homogeneous film formed which was vacuum dried at 40°C. and then conventionally cyclized by heating, for example up to 300°C. in a heated oven for one hour. The IR-spectrum did not show amide or carboxyl bands after the cyclization, but it did show imide bands.

EXAMPLE 2

4.36 g (0.02 mol) of PMA were wetted with 5 g of benzene and cooled as in Example 1. 3.96 g (0.02 mol) of MDA in 35 g DMF were then added. After stirring for 10 seconds with cooling, the reaction was completed. A homogeneous, clear, gel-free polymeric polyamide acid solution was obtained with $\eta_{red} = 2.9$.

EXAMPLE 3

The same procedures were used as in Examples 1 and 2, except that tetrahydrofuran was used as the wetting agent, and NMP was used as the polar solvent. The polymerization period lengthened to 50–70 seconds. The viscosity of the product was $\eta_{red} = 3.2$ (0.5% by wt. solution of the polymer in NMP at 20°C.)

EXAMPLES 4–12

0.02 mol finely ground PMA or BTA were wetted with the solvents listed in Table 1 below and cooled to 10°–15°C. Subsequently 0.02 mol ODA, MDA or SDA dissolved in DMF, DMAC or NMP were quickly reacted under vigorous stirring and cooling. One-half hour after the termination of the reaction, the reduced viscosity was measured as a 0.5% by wt. solution in the corresponding solvent at 20°C. Table 1 below summarizes the amounts of the reactants and the solvent concentrations or proportions, as well as the reaction conditions and results.

EXAMPLES 13–21

These examples show the use of a polar aprotic solvent for the wetting or suspension of the dianhydride. 0.02 mol of PMA or BTA were admixed with a quantity of approximately 1.5 times to 3.5 times their weight of DMF, DMAC or NMP as solvent cooled to 5°–10°C. such that a complete wetting occurred. The dianhydride thereby formed a loose, porous mass. This wetted material was subsequently broken up with a stirrer and then admixed with a solution of PMA or BTA as the diamine in the same solvent while stirring and cooling at a temperature of 5°–10°C. Table 2 below gives a summary for the reaction components, conditions and results. The viscosity values were measured one-half hour after completion of the reaction at 20°C. in a 0.5% by wt. solution of the polymer in the same solvent which had been used for the polyaddition reaction.

EXAMPLES 22–37

0.03 mol of a bis-diamide-dianhydride are mixed with half of the quantity of the solvent being used, while cooling to 10°–15°C. so that a complete wetting was accomplished. The wetted material was well stirred with a mixing device after which there was added 0.03 mol of the diamine dissolved in the other half of the solvent, cooled to 10°C. The reaction took place within 10 to 60 seconds, depending on the solvent used. The stirring speeds were 1000 rpm in all of the tests. During the reaction, the temperature increased to 28°–32°C. The determination of viscosity was made one-half after termination of the reaction at 20°C. in a 0.5% by wt. solution of the polymer in the solvent used for the polyaddition. Table 3 below summarizes all of the pertinent information regarding the reactants, reaction conditions and results. The abbreviations used for the bis-diamide-dianhydride reactant are explained by Table 5 below.

EXAMPLES 38–41

In this set of examples, 0.03 mol of a bis-ester-dianhydride was mixed or dissolved (depending on the type of bis-ester-dianhydride being used) in one-half the total quantity of the solvent to be used and cooled to approximately 10°–15°C. The completely wetted substance or the solution was stirred well, and 0.03 mol of the diamine, dissolved in the remaining half of the solvent, cooled to 10°C., was then added. The reaction occurred, depending upon the solvent used, within 10–60 seconds. The stirring speeds were 1000 rpm in all tests. During the reaction, the temperature rose to about 30°C. The determination of viscosity was made one-half hour after completion of the reaction at 20°C. in a 0.5% by wt. solution of the polymer in the solvent used for the polyaddition. Table 4 below summarizes the reactants and solvents as well as the reaction conditions and results. The abbreviations used for the bis-ester-dianhydrides are explained by Table 5 below.

| ABREVIATION | STRUCTURAL FORMULA |
|---|---|
| ODA-TMA | |
| MDA-TMA | |
| SDA-TMA | |
| EDA-TMA | |
| HDA-TMA | |
| PYDA-TMA | |
| BPA-TMA | |
| ODP-TMA | |
| EGLY-TMA | |
| GLY-TMA | |
| ODO-TMA | |

TABLE 1

| | EXAMPLE NO. | | | | | | | | |
|---|---|---|---|---|---|---|---|---|---|
| | 4 | 5 | 6 | 7 | 8 | 9 | 10 | 11 | 12 |
| Dianhydride | PMA | BTA | PMA | PMA | BTA | PMA | PMA | PMA | BTA |
| Amount (g) | 4.36 | 6.44 | 4.36 | 4.36 | 6.44 | 4.36 | 4.36 | 4.36 | 6.44 |
| mol | 0.02 | 0.02 | 0.02 | 0.02 | 0.02 | 0.02 | 0.02 | 0.02 | 0.02 |
| Wetting or Suspending Agent | THF | Toluene | Xylene | Ethyl-methyl-ketone | Acetone | Toluene | Toluene | Acetonitrile | Toluene |
| Amount (g) | 4.00 | 4.00 | 4.00 | 3.00 | 4.00 | 6.00 | 6.00 | 5.00 | 6.00 |
| % by wt. with ref. to total solvent | 9 | 9 | 10 | 7.6 | 9 | 13 | 13 | 12.5 | 14.6 |
| % by wt. with ref. to total polymer | 7.6 | 7.3 | 8.2 | 6.2 | 7.3 | 11 | 11 | 10.3 | 11.7 |
| Diamine | ODA | ODA | MDA | SDA | MDA | MDA | MDA | MDA | MDA |
| Amount (g) | 4.00 | 4.00 | 3.96 | 4.96 | 3.96 | 3.96 | 3.96 | 3.96 | 3.96 |
| mol | 0.02 | 0.02 | 0.02 | 0.02 | 0.02 | 0.02 | 0.02 | 0.02 | 0.02 |
| Polar Aprotic Solvent | DMF | DMF | DMAC | DMAC | DMAC | NMP | NMP | NMP | NMP |
| Amount (g) | 40.0 | 40 | 36 | 36 | 40 | 40 | 40 | 35 | 35 |
| Molar Ratio Dianhydride:Diamine | 1:1 | 1:1 | 1:1 | 1:1 | 1:1 | 1:1 | 1:1 | 1:1 | 1:1 |
| Solids Content % by wt. | 15.9 | 19.1 | 17.2 | 19.2 | 19.1 | 15.3 | 15.3 | 17.2 | 20.2 |
| Stirring Speed r.p.m. | 1300 | 1300 | 1300 | 1500 | 1500 | 1500 | 1500 | 1500 | 1500 |
| Reaction Temperature | | | | | | | | | |
| Initial temp. | 15 | 15 | 14 | 12 | 13 | 15 | 15 | 10 | 12 |
| Final temp. °C | 35 | 36 | 36 | 34 | 35 | 36 | 37 | 37 | 38 |
| Reaction Time sec. | 12 | 11 | 10 | 10 | 12 | 70 | 65 | 62 | 70 |
| $\eta_{red}$ (viscosity) 0.5% solution at 20°C. | 1.9 | 2.1 | 2.0 | 2.2 | 2.1 | 1.6 | 1.7 | 1.8 | 2.4 |
| Homogeneity | + | + | + | + | + | + | + | + | + |
| Gel Particles | − | − | − | − | − | − | − | − | − |
| Solid Anhydride (residue) | − | − | − | − | − | − | − | − | − |

TABLE 2

| | EXAMPLE NO. | | | | | | | | |
|---|---|---|---|---|---|---|---|---|---|
| | 13 | 14 | 15 | 16 | 17 | 18 | 19 | 20 | 21 |
| Dianhydride | PMA | PMA | PMA | BTA | PMA | PMA | BTA | PMA | PMA |
| Amount (g) | 4.36 | 4.36 | 4.36 | 6.44 | 4.36 | 4.36 | 6.44 | 4.36 | 4.36 |
| mol | 0.02 | 0.02 | 0.02 | 0.02 | 0.02 | 0.02 | 0.02 | 0.02 | 0.02 |
| Wetting or Suspending Agent | DMF | DMF | DMF | DMAC | DMAC | DMAC | NMP | NMP | NMP |
| Amount (g) | 15 | 15 | 10 | 10 | 10 | 10 | 15 | 10 | 10 |
| Diamine | ODA | MDA | MDA | MDA | MDA | MDA | ODA | MDA | ODA |
| Amount (g) | 4.00 | 3.96 | 3.96 | 3.96 | 3.96 | 3.96 | 4.00 | 3.96 | 4.00 |
| mol | 0.02 | 0.02 | 0.02 | 0.02 | 0.02 | 0.02 | 0.02 | 0.02 | 0.02 |
| Polar Aprotic Solvent | DMF | DMF | DMF | DMAC | DMAC | DMAC | NMP | NMP | NMP |
| Amount (g) | α | 25.5 | 15 | 27.0 | 19.5 | 10.5 | 15 | 51 | |
| Molar Ratio Dianhydride:Diamine | 1:1 | 1:1 | 1:1 | 1:1 | 1:1 | 1:1 | 1:1 | 1:1 | 1:1 |
| Solids Content % by wt. | 10 | 17 | 25 | 22 | 22 | 22 | 8 | 25 | 25 |
| Stirring Speed r.p.m. | 1500 | 1500 | 1500 | 1500 | 1500 | 1500 | 1500 | 1500 | 1500 |
| Reaction Temperature | | | | | | | | | |
| Initial Temp. | 8 | 10 | 7 | 11 | 12 | 10 | 5 | 5 | 5 |
| Final Temp. °C. | 36 | 37 | 34 | 32 | 34 | 33 | 28 | 30 | 31 |
| Reaction Time sec. | 8 | 10 | 8 | 22 | 18 | 16 | 75 | 48 | 52 |
| $\eta_{red}$ (viscosity) 0.5% solution at 20°C. | 0.7 | 1.6 | 3.2 | 2.9 | 2.8 | 3.0 | 0.6 | 3.1 | 3.2 |
| Homogeneity | + | + | + | + | + | + | + | + | + |
| Gel Particles | − | − | − | − | − | − | − | − | − |
| Solid Anhydride (residue) | − | − | − | − | − | − | − | − | − |

TABLE 3

| | EXAMPLE NO. | | | | | | | | | |
|---|---|---|---|---|---|---|---|---|---|---|
| | 22 | 23 | 24 | 25 | 26 | 27 | 28 | 29 | 30 | 31 |
| Dianhydride | ODA-TMA | MDA-TMA | MDA-TMA | SDA-TMA | EDA-TMA | HDA-TMA | PYDA-TMA | ODA-TMA | ODA-TMA | ODA-TMA |
| Amount (g) | 16.45 | 16.39 | 16.39 | 17.89 | 12.25 | 13.93 | 13.72 | 16.43 | 16.45 | 16.45 |
| mol | 0.03 | 0.03 | 0.03 | 0.03 | 0.03 | 0.03 | 0.03 | 0.03 | 0.03 | 0.03 |
| Wetting or Suspending Agent | DMF | DMAC | DMAC | DMAC | DMF | NMP | NMP | NMP | NMP | NMP |
| Amount (g) | 64 | 63 | 45 | 57 | 50 | 35 | 45 | 45 | 33.7 | 21 |

TABLE 3-continued

| | EXAMPLE NO. | | | | | | | | | |
|---|---|---|---|---|---|---|---|---|---|---|
| | 22 | 23 | 24 | 25 | 26 | 27 | 28 | 29 | 30 | 31 |
| Diamine | ODA | MDA | MDA | SDA | MDA | ODA | ODA | ODA | ODA | ODA |
| Amount (g) | 6.00 | 5.94 | 5.94 | 7.44 | 5.94 | 6.00 | 6.00 | 6.00 | 6.00 | 6.00 |
| mol | 0.03 | 0.03 | 0.03 | 0.03 | 0.03 | 0.03 | 0.03 | 0.03 | 0.03 | 0.03 |
| Solvent | DMF | DMAC | DMAC | DMAC | DMF | NMP | NMP | NMP | NMP | NMP |
| Amount (g) | 64 | 63.5 | 45 | 58.5 | 53 | 36 | 45 | 45 | 33.7 | 21 |
| Molar Ratio Dianhydride: Diamine | 1:1 | 1:1 | 1:1 | 1:1 | 1:1 | 1:1 | 1:1 | 1:1 | 1:1 | 1:1 |
| Solids Content % by wt. | 15 | 15 | 20 | 18 | 15 | 22 | 18 | 20 | 25 | 35 |
| Stirring Speed r.p.m. | 1000 | 1000 | 1000 | 1000 | 1000 | 1000 | 1000 | 1000 | 1000 | 1000 |
| Reaction Temp. Initial Temp. | 12 | 10 | 11 | 12 | 14 | 13 | 10 | 12 | 12 | 12 |
| Final Temp. °C. | 27 | 26 | 28 | 29 | 32 | 27 | 25 | 29 | 32 | 33 |
| React. time sec. | 10 | 25 | 25 | 25 | 10 | 50–60 | 50–60 | 50–60 | 50–60 | 50–60 |
| Homogeneity | + | + | + | + | + | + | + | + | + | + |
| Gel Particles | − | − | − | − | − | − | − | − | − | − |
| Adhesion | good | good | good | good | good | good | good | good | good | satisfactory |
| $\eta_{red}$ (viscosity) 0.5% solution at 20°C. | 0.4 | 0.5 | 0.8 | 0.7 | 0.4 | 0.9 | 0.7 | 0.8 | 1.3 | 4.5 |

TABLE 4

| | EXAMPLE NO. | | | | | | | | | |
|---|---|---|---|---|---|---|---|---|---|---|
| | 32 | 33 | 34 | 35 | 36 | 37 | 38 | 39 | 40 | 41 |
| Dianhydride | BPA-TMA | BPA-TMA | BPA-TMA | ODP-TMA | ODP-TMA | EGLY-TMA | GLY-TMA | GLY-TMA | GLY-TMA | ODO-TMA |
| Amount (g) | 17.29 | 17.29 | 17.29 | 16.03 | 16.03 | 12.31 | 13.21 | 13.21 | 13.21 | 16.51 |
| mol | 0.03 | 0.03 | 0.03 | 0.03 | 0.03 | 0.03 | 0.03 | 0.03 | 0.03 | 0.03 |
| Wetting or Suspending Agent | DMF | DMAC | NMP | NMPF | NMP | NMP | NMP | NMP | NMP | NMF |
| Amount (g) | 182 | 85 | 53 | 44 | 44 | 52 | 110 | 50 | 30 | 55 |
| Diamine | ODA | MDA | MDA | ODA | MDA | MDA | MDA | MDA | MDA | ODA |
| Amount (g) | 6.00 | 5.94 | 5.94 | 6.00 | 5.94 | 5.94 | 5.94 | 5.94 | 5.94 | 6.00 |
| mol | 0.03 | 0.03 | 0.03 | 0.03 | 0.03 | 0.03 | 0.03 | 0.03 | 0.03 | 0.03 |
| Solvent | DMF | DMAC | NMP | NMP | NMP | NMP | NMP | NMP | NMP | NMP |
| Amount (g) | 183 | 85 | 53 | 44 | 44 | 52 | 110 | 60.5 | 31 | 55 |
| Molar Ratio Dianhydride: Diamine | 1:1 | 1:1 | 1:1 | 1:1 | 1:1 | 1:1 | 1:1 | 1:1 | 1:1 | 1:1 |
| Solids Content % by wt. | 6 | 12 | 18 | 20 | 20 | 15 | 8 | 16 | 24 | 17 |
| Stirring Speed r.p.m. | 1000 | 1000 | 1000 | 1000 | 1000 | 1000 | 1000 | 1000 | 1000 | 1000 |
| Reaction Temp. Initial temp. | 10 | 10 | 10 | 14 | 14 | 12 | 11 | 10 | 11 | 13 |
| Final Temp. °C. | 28 | 30 | 29 | 30 | 31 | 28 | 27 | 26 | 27 | 30 |
| React. time sec. | 10 | 15–25 | 50–60 | 50–60 | 50–60 | 50–60 | 50–60 | 50–60 | 50–60 | 50–60 |
| $\eta_{red}$ (viscosity) 0.5% solution at 20°C. | 0.2 | 0.5 | 0.6 | 0.6 | 0.7 | 0.5 | 0.3 | 0.7 | 0.9 | |
| Homogeneity | + | + | + | + | + | + | + | + | + | + |
| Gel Particles | − | − | − | − | − | − | − | − | − | − |
| Adhesion | + | + | + | + | + | + | + | + | + | + |

The invention is hereby claimed as follows:

1. In a process for the production of a polyamic acid as the prepolymer in the formation of a polyimide by the reaction of approximately equimolar amounts of a tetracarboxylic acid dianhydride with a diprimary diamine at a temperature below about 50°C. and under substantially water-free conditions in an anhydrous, polar, aprotic organic solvent, the improvement which comprises:

first treating the dianhydride reactant in the form of solid fine particles by adding thereto a limited amount of a solvent, using (a) an inert organic solvent in an amount sufficient only to wet said dianhydride or (b) a polar, aprotic organic solvent in an amount at least sufficient to wet said dianhydride up to an amount which forms the dianhydride into a paste or suspension; and then adding a solution of said diamine in the polar, aprotic organic solvent continuously or in portions to the thus treated dianhydride under thorough mixing.

2. A process as claimed in claim 1 wherein the polar, aprotic solvent is selected from the group consisting of dimethylformamide, dimethylacetamide and N-methylpyrrolidone.

3. A process as claimed in claim 1 wherein the inert organic solvent is selected from the group consisting of acetone, methyl ethyl ketone, acetonitrile, benzene, toluene, xylene, hexane, cyclohexane and benzine.

4. A process as claimed in claim 1 wherein the total amount of the polar, aprotic organic solvent is at least 60% by weight up to about 99% by weight, with reference to the polyamic acid being formed, while the amount of the inert organic solvent is up to about 33% by weight, with reference to the amount of the polar, aprotic organic solvent.

5. A process as claimed in claim 4 wherein said polar, aprotic solvent is selected from the group consisting of dimethylformamide, dimethylacetamide and N-methylpyrrolidone and said inert organic solvent is selected from the group consisting of acetone, methyl ethyl ketone, acetonitrile, benzene, toluene, xylene, hexane, cyclohexane and benzine.

6. A process as claimed in claim 1 wherein the total amount of the polar, aprotic organic solvent is about 70 to 90% by weight, with reference to the polyamic acid being formed, while the amount of the inert organic solvent is up to about 25% by weight, with reference to the amount of the polar, aprotic organic solvent.

7. A process as claimed in claim 6 wherein the amount of the inert organic solvent is about 1 – 20% by weight, with reference to the amount of the polar, aprotic organic solvent.

8. A process as claimed in claim 7 wherein said polar, aprotic solvent is selected from the group consisting of dimethylformamide, dimethylacetamide and N-methylpyrrolidone and said inert organic solvent is selected from the group consisting of acetone, methyl ethyl ketone, acetonitrile, benzene, toluene, xylene, hexane, cyclohexane and benzine.

9. A process as claimed in claim 1 wherein the wetting of the dianhydride reactant proceeds at about 5°C. to 20°C. for a period of not more than about 5 minutes, after which the diamine solution is immediately added to form said polyamic acid by reaction with said dianhydride.

* * * * *